(12) United States Patent
 Martins

(10) Patent No.: US 12,619,855 B2
(45) Date of Patent: May 5, 2026

(54) MODEL POOL FOR MULTIMODAL DISTRIBUTED LEARNING

(71) Applicant: Telefonaktiebolaget LM Ericsson (publ), Stockholm (SE)

(72) Inventor: Jean Paulo Martins, Indaiatuba (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 965 days.

(21) Appl. No.: 17/792,747

(22) PCT Filed: Jan. 17, 2020

(86) PCT No.: PCT/EP2020/051196
 § 371 (c)(1),
 (2) Date: Jul. 14, 2022

(87) PCT Pub. No.: WO2021/144037
 PCT Pub. Date: Jul. 22, 2021

(65) Prior Publication Data
 US 2023/0044035 A1 Feb. 9, 2023

(51) Int. Cl.
 *G06N 3/045* (2023.01)
(52) U.S. Cl.
 CPC .................................... *G06N 3/045* (2023.01)
(58) Field of Classification Search
 CPC .................................... G06N 3/045; G06N 3/08
 See application file for complete search history.

(56) References Cited

U.S. PATENT DOCUMENTS

| | | | |
|---|---|---|---|
| 10,785,199 B1 * | 9/2020 | Chhabra | H04L 63/045 |
| 2021/0150037 A1 * | 5/2021 | Radhakrishnan | G06N 20/00 |

OTHER PUBLICATIONS

McMahan, H. B., "Communication-Efficient Learning of Deep Networks from Decentralized Data", https://arxiv.org/abs/1602. 05629v3, Feb. 28, 2017 (Year: 2017).*
International Search Report and the Written Opinion of the International Searching Authority, issued in corresponding International Application No. PCT/EP2020/051196, dated Oct. 7, 2020, 11 pages.
Liu et al. "Distributed Multi-Task Relationship Learning" KDD 2017 Research Paper, KDD'17, August 13-17, Halifax, NS, Canada, pp. 937-946.

(Continued)

*Primary Examiner* — Alexey Shmatov
*Assistant Examiner* — Devika S Maharaj
(74) *Attorney, Agent, or Firm* — Sonoda & Kobayashi Intellectual Property Law; Sarvajit S. Patil

(57) ABSTRACT

A method performed by a central server node is provided. The method includes: receiving local model weights and corresponding key from a local client node; and updating a model pool having a plurality of central models and corresponding keys associated with each of the central models. Updating the model pool is based on the local model weights, and one or more of the key corresponding to the local client node and the keys collectively corresponding to each of the central models. Updating the model pool comprises updating at least two of the plurality of central models contained in the model pool.

16 Claims, 9 Drawing Sheets

(56) References Cited

OTHER PUBLICATIONS

Smith et al. "Federated Multi-Task Learning" Jan. 1, 2017, XP055732999, 31st Conference on Neutral Information Processing Systems (NIPS 2017), Long Beach, CA, retrieved from https://papers.nips.cc/paper/7029-federated-multi-task-learning.pdf, 11 pages.

Andoni et al. "Near-Optimal Hashing Algorithms for Approximate Nearest Neighbor in High Dimensions" Communications of the ACM, Jan. 2008/vol. 51, No. 1, pp. 117-122.

Fritzke "A Growing Neural Gas Network Learns Topologies" 1994, pp. 625-632.

Cohen-Addad et al. "Online k-means Clustering" arXiv:1909.06861v1 [cs.LG] Sep. 15, 2019, 19 pages.

McMahan et al. "Communication-Efficient Learning of Deep Networks from Decentralized Data" Proceedings of the 20th International Conference on Artificial Intelligence and Statistics (AISTATS) 2017, Fort Lauderdale, Florida, USA, JMLR: W&CP vol. 54, 11 pages.

* cited by examiner

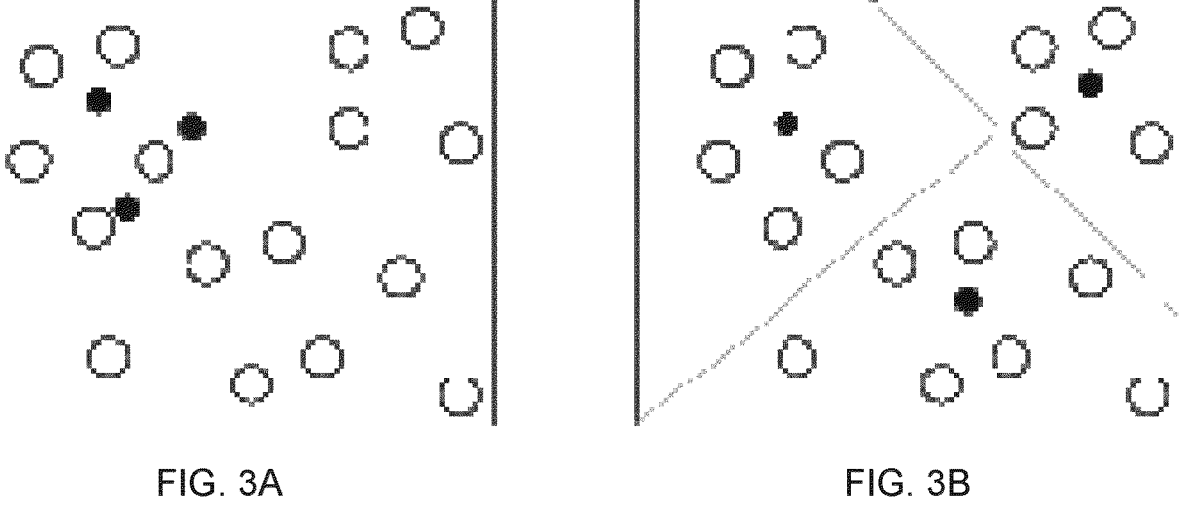
FIG. 3A                             FIG. 3B

600

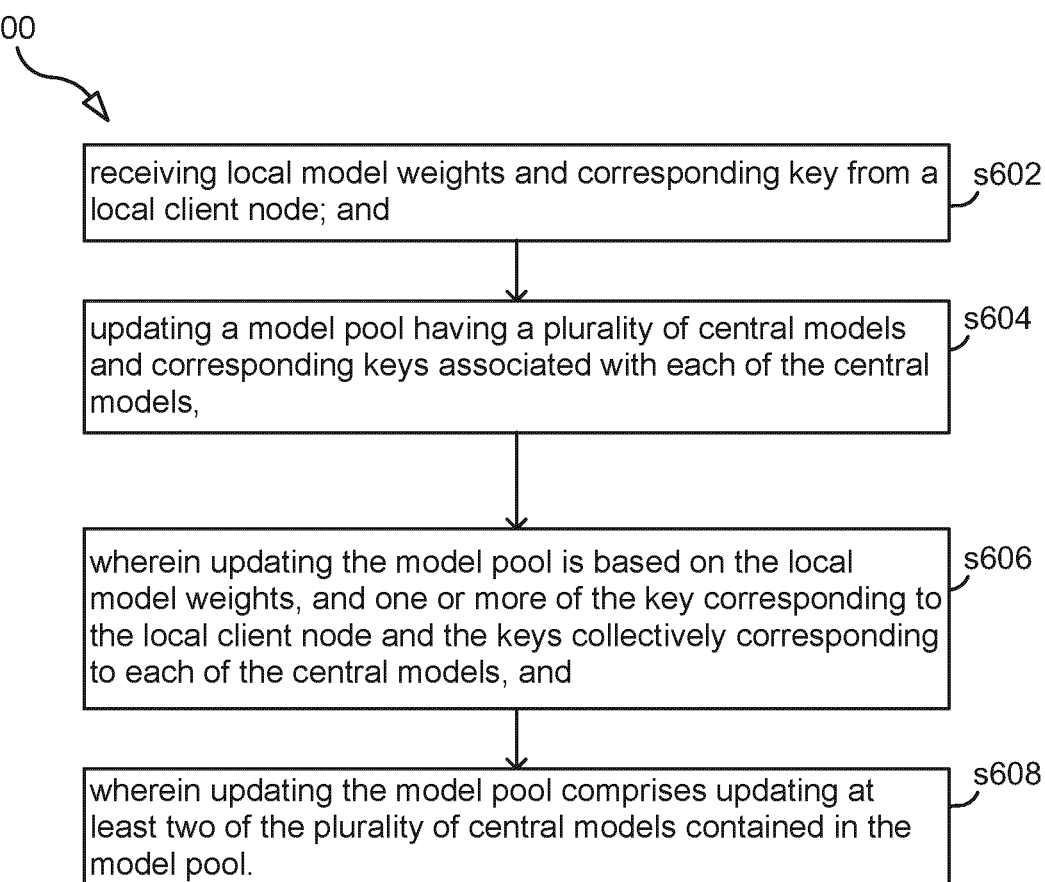

receiving local model weights and corresponding key from a local client node; and — s602 updating a model pool having a plurality of central models and corresponding keys associated with each of the central models, — s604 wherein updating the model pool is based on the local model weights, and one or more of the key corresponding to the local client node and the keys collectively corresponding to each of the central models, and — s606 wherein updating the model pool comprises updating at least two of the plurality of central models contained in the model pool. — s608

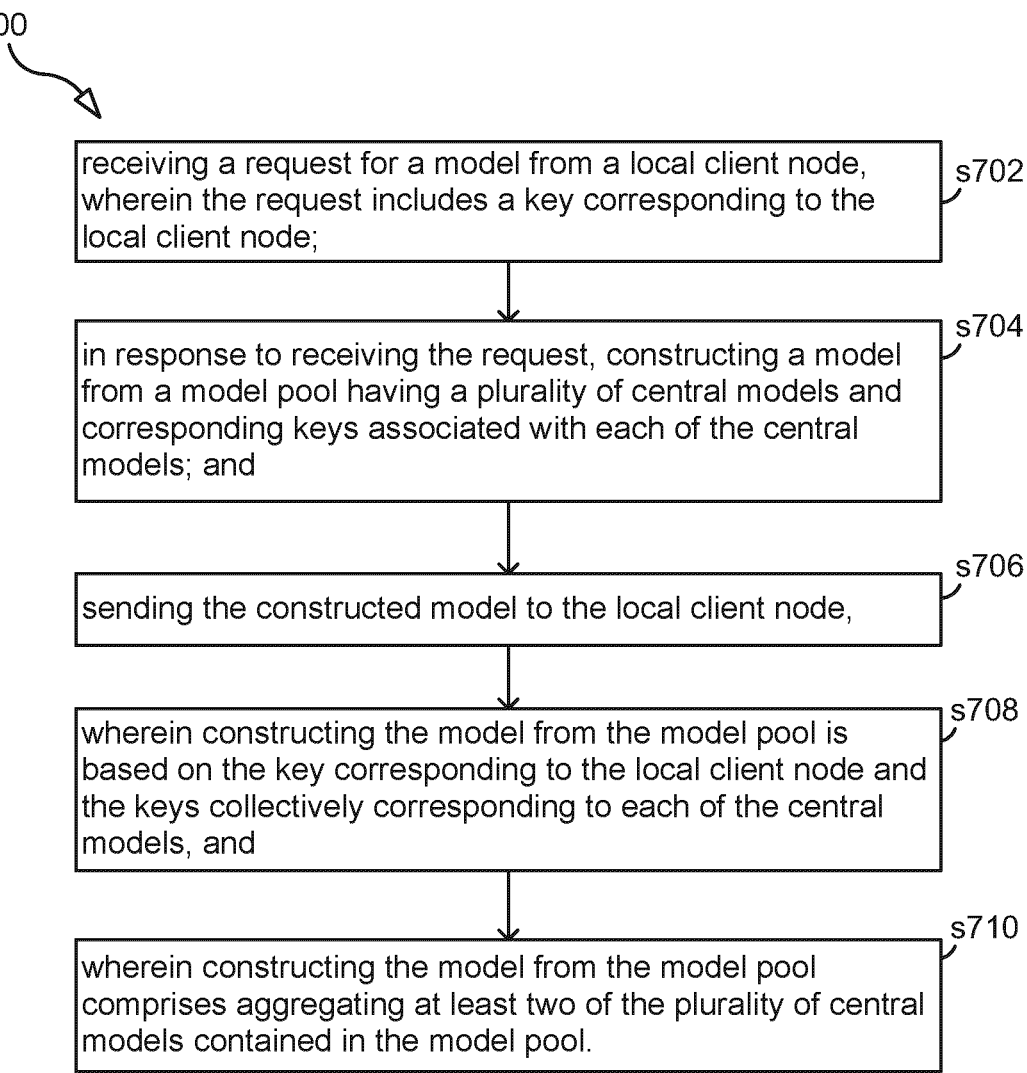

receiving a request for a model from a local client node, wherein the request includes a key corresponding to the local client node;                                    s702 in response to receiving the request, constructing a model from a model pool having a plurality of central models and corresponding keys associated with each of the central models; and                                    s704 sending the constructed model to the local client node,                                    s706 wherein constructing the model from the model pool is based on the key corresponding to the local client node and the keys collectively corresponding to each of the central models, and                                    s708 wherein constructing the model from the model pool comprises aggregating at least two of the plurality of central models contained in the model pool.                                    s710

FIG. 7

Apparatus
800

MODULE(S)
900

FIG. 9

MODEL POOL FOR MULTIMODAL DISTRIBUTED LEARNING

CROSS REFERENCE TO RELATED APPLICATION(S)

This application is a 35 U.S.C. § 371 National Phase Entry Application from PCT/EP2020/051196, filed Jan. 17, 2020, designating the United States, the disclosure of which is incorporated herein by reference in its entirety.

TECHNICAL FIELD

Disclosed are embodiments related to distributed learning; and, in particular, to a model pool for multimodal distributed learning.

BACKGROUND

Distributed learning, involving decentralized data, is a technique of machine learning that addresses various data-related constraints (e.g., privacy, bandwidth), that prohibit or otherwise limit the transference of local training data from local client nodes to a central node for centralized processing. In such scenarios, learning from data occurs locally, with updates being sent from local client nodes to a central server node so that different local client nodes can affect the global model without having to sacrifice the security or privacy of their local training data.

Consider as an example the problem of predicting a word from a prefix typed in a mobile device. Local devices equipped with a learning procedure can model a user's typing behavior to suggest or recommend a suffix to complete the partially-typed-in word. Considering many users that share a common language, the resulting models from each local device can be combined (e.g., averaged) to produce a global model that is still representative of the problem. Federated learning (a type of distributed learning) is a technique that applies to this type of problem, where multiple local models can be averaged to create an accurate global model.

Federated learning works in rounds, where each round comprises:

At a central server node, selecting a subset of participating nodes.

At the central server node, sending the current global model to the selected nodes.

At each of the selected nodes, training the global model locally on a local dataset.

At each of the selected nodes, sending updates back to the central server node reflecting the local training.

At the central server node, aggregating the updates and applying them to the global model.

Continuing with the previous example of word prediction, now consider multiple users typing in different languages. In such an example, the training data distributions may vary considerably from one user to another. Applying the traditional federated learning approach in this example undoubtedly results in undesired accuracy degradation, i.e., updates learned from one language might contradict updates from another. Of course, in this example it may suffice to maintain a different global model for each language. However, in more general real-world scenarios, such a prior separation might be hard or impossible to identify.

SUMMARY

Problems arise in the case of differently distributed training data among local client nodes. For example, typical federated learning techniques implement model composition through averaging, which is not robust to scenarios where local data distributions are far from independent and identically distributed (IID). Typical federated learning techniques support only one central model that is improved using updates from the local models, which imposes challenges for non-overlapping, non-IID data distributions. Given either a target scenario of deployment or a target data distribution, typical federated learning techniques can only provide a central model which, if the local target distribution is significantly different from other local client nodes, is unlikely to be a good starting point.

Some federated learning techniques apply clustering in order to cluster local client nodes into different groups. Such techniques are limited and do not fully address the issues noted above, among other problems they have. For example, such clustering approaches require the specification of the number of clusters in which to classify the local client nodes, must be updated to reflect the current situation if data distributions of local client nodes varies over time, and are also limited in how such approaches cluster local client nodes, relying on local training data but no other local client resources. Further, such clustering techniques are an all-or-nothing approach, where if two local client nodes have similar data distribution but belong to different clusters, updates from one of the local client nodes will not be propagated to the other.

Accordingly, improved learning techniques are needed. Embodiments disclosed herein provide improved machine learning in a distributed learning environment, in situations where local training data have significant differences in their distribution. For example, such significant differences in distribution of local training data could arise from intrinsic local characteristics of the different local client nodes (e.g., hardware, software, geographical location, system type). Regardless of the reason for differing distributions, if such differences are significant it could affect the ability to maintain a well-performing centralized model that represents each of the local client nodes, e.g. because updates from local client nodes having a different distribution may result in decreased performance or even prevent the global model from converging. In such situations, where local client nodes have significantly different training data distributions, it can be said that the global data distribution is multimodal. Embodiments herein provide for improved learning by maintaining a model pool of central models to cover multiple local data distributions.

Embodiments employ and manage a pool of models for use in a distributed learning environment (e.g., federated learning). The model pool may be used to store, update, and retrieve a set of central models. The model pool defines reading and writing operations to manipulate the stored central models. In some embodiments, each central model in the model pool may be associated with a key, such as a carefully designed key that identifies the training scenario and the data distribution that the central model is trained for. Then, given an input key (e.g., from a local client node) and a distance of the input key to the keys of the central models in the model pool, a composite model can be aggregated from the central models of the model pool as a weighted average, where the weighting is biased based on a similarity of the input key with the keys of the central models in the model pool. In embodiments, keys are designed with the property of locality preservation, implying that similar training scenarios and data distributions produce similar keys.

In embodiments, reading and writing operations are defined for the model pool and these may be implemented in a distributed manner. That is, keys may be used to read from and/or write to multiple central models in the model pool. The influence of each central model in the result of the operation depends on how similar the corresponding key of the central model is to the input key. Since, in embodiments, the keys carry information about training scenarios and data distribution, central models from conflicting backgrounds (having different training scenarios or data distribution) have a weak influence on each other, which allows the coverage of a wide range of scenarios and data distributions.

Embodiments advantageously allow a central model to be determined (e.g., read from the model pool) to match a particular target deployment scenario and/or target data distribution. Embodiments advantageously allow updating a central model (e.g., write to the model pool) using either a full key (both local scenario and data distribution) or a partial key (one of local scenario and data distribution). Embodiments may also advantageously adjust the size of the model pool (e.g., increase and/or decrease a number of central models in the model pool).

Embodiments further advantageously define a unified and efficient way to specify keys to identify the local client nodes' training data and resources using locality-preserving hashing. Embodiments are efficient, e.g. because clustering is not required based on keys of the local client nodes and cluster consistency does not need to be evaluated between rounds of learning.

According to a first aspect, a method performed by a central server node is provided. The method includes receiving local model weights and corresponding key from a local client node; and updating a model pool having a plurality of central models and corresponding keys associated with each of the central models. Updating the model pool is based on the local model weights, and one or more of the key corresponding to the local client node and the keys collectively corresponding to each of the central models. Updating the model pool comprises updating at least two of the plurality of central models contained in the model pool.

In some embodiments, updating the model pool further comprises computing a similarity score comparing the key corresponding to the local client node to the keys collectively corresponding to each of the plurality of central models, and wherein updating at least two of the plurality of central models is based on the similarity score. In some embodiments, the method further includes selecting the at least two of the plurality of central models from the model pool based on the similarity score. In some embodiments, the at least two of the plurality of central models from the model pool comprise all of the plurality of central models. In some embodiments, updating at least two of the plurality of central models comprises, for each central model of the at least two of the plurality of central models, combining the local model weights with a current version of the central model such that the local model weights are given a greater weight for central models having a higher corresponding similarity score than for central models having a lower corresponding similarity score.

In some embodiments, updating at least two of the plurality of central models comprises computing new model weights $$\Theta_i^{new} = (\Theta_i^{old}(+\bar{\Theta}_i)/2$$

for each i in a set of indexes corresponding to the at least two of the plurality of central models, where:

4

$$\Theta_i^{new}$$

refers to the new model weights for the central model corresponding to the index i, $$\Theta_i^{old}$$

refers to old model weights for the central model corresponding to the index i, $$\bar{\Theta}_i = (1 - w_i)\Theta_i^{old} + w_i\bar{\Theta},$$

$W=(w_1, \ldots, w_M)$ is the similarity score, such that $w_i$ corresponds to the similarity between the key corresponding to the local client node and the key corresponding to the i-th central model of the plurality of central models, M is the number of the plurality of central models in the model pool, and $\bar{\Theta}$ refers to the local model weights.

In some embodiments, the similarity score W is normalized such that $\Sigma w_i=1$. In some embodiments, one or more keys of the key corresponding to the local client node and the keys of the model pool corresponding collectively to each of the plurality of central models, each includes a data distribution part and a deployment part, wherein the data distribution part of each of the one or more keys includes information describing a data distribution corresponding to the respective local client node or central model, and wherein the deployment part of each of the one or more keys includes information describing a deployment environment corresponding to the respective local client node or central model.

In some embodiments, computing a similarity score is based on a similarity function $d(k_1, k_2)$ between a first key $k_1$ having data distribution part $$k_1^D$$

and deployment part $$k_1^S$$

and a second key $k_2$ having data distribution part $$k_2^D$$

and deployment part $$k_2^s,$$

such that $$d(k_1, k_2) = d_D(k_1^D, k_2^D) + d_S(k_1^S, k_2^S).$$

In some embodiments, updating the model pool is performed as a result of receiving local model weights and a corresponding key, without needing to wait on additional local model weights and corresponding keys from additional local client nodes. In some embodiments, the method further includes modifying the model pool such that a distribution of the keys corresponding to the central models of the model pool is modified based on the corresponding key from the local client node.

According to a second aspect, a method performed by a central server node is provided. The method includes receiving a request for a model from a local client node, wherein the request includes a key corresponding to the local client node; in response to receiving the request, constructing a model from a model pool having a plurality of central models and corresponding keys associated with each of the central models; and sending the constructed model to the local client node. Constructing the model from the model pool is based on the key corresponding to the local client node and the keys collectively corresponding to each of the central models. Constructing the model from the model pool comprises aggregating at least two of the plurality of central models contained in the model pool.

In some embodiments, constructing the model from the model pool further comprises computing a similarity score comparing the key corresponding to the local client node to the keys collectively corresponding to each of the plurality of central models, and wherein aggregating at least two of the plurality of central models is based on the similarity score. In some embodiments, the method further includes selecting the at least two of the plurality of central models from the model pool based on the similarity score. In some embodiments, the at least two of the plurality of central models from the model pool comprise all of the plurality of central models. In some embodiments, aggregating at least two of the plurality of central models is performed such that the central models of the at least two of the plurality of central models having a higher corresponding similarity score are weighted more than models having a lower corresponding similarity score.

In some embodiments, aggregating at least two of the plurality of central models comprises computing aggregated model weights $$\theta^{agg} = \frac{1}{M} \sum_{i=1}^{M} w_i \theta_i,$$

where:

$$\Theta_i^{agg}$$

refers to the aggregated model weights for the constructed model,

M is the number of the plurality of central models in the model pool, $\theta_i$ refers to model weights for the central model corresponding to the index i, and W=$(w_1, \ldots, w_M)$ is the similarity score, such that $w_i$ corresponds to the similarity between the key corresponding to the local client node and the key corresponding to the i-th central model of the plurality of central models.

In some embodiments, the similarity score W is normalized such that $\Sigma w_i = 1$. In some embodiments, one or more keys of the key corresponding to the local client node and the keys of the model pool corresponding collectively to each of the plurality of central models, each includes a data distribution part and a deployment part, wherein the data distribution part of each of the one or more keys includes information describing a data distribution corresponding to the respective local client node or central model, and wherein the deployment part of each of the one or more keys includes information describing a deployment environment corresponding to the respective local client node or central model.

In some embodiments, computing a similarity score is based on a similarity function $d(k_1, k_2)$ between a first key $k_1$ having data distribution part $$k_1^D$$

and deployment part $$k_1^S$$

and a second key $k_2$ having data distribution part $$k_2^D$$

and deployment part $$k_2^S,$$

such that $$d(k_1, k_2) = d_D(k_1^D, k_2^D) + d_S(k_1^S, k_2^S).$$

In some embodiments, the method further includes modifying the model pool such that a distribution of the keys corresponding to the central models of the model pool is modified based on the corresponding key from the local client node.

According to a third aspect, a central server node is provided, the central server node comprising processing circuitry and a memory containing instructions executable by the processing circuitry. The processing circuitry is operable to: receive local model weights and corresponding key from a local client node; and update a model pool having a plurality of central models and corresponding keys associated with each of the central models. Updating the model pool is based on the local model weights, and one or more of the key corresponding to the local client node and the keys collectively corresponding to each of the central models. Updating the model pool comprises updating at least two of the plurality of central models contained in the model pool. In some embodiments, the central server node is for enabling accurate distributed machine learning.

According to a fourth aspect, a central server node is provided, the central server node comprising processing circuitry and a memory containing instructions executable by the processing circuitry. The processing circuitry is operable to: receive a request for a model from a local client node, wherein the request includes a key corresponding to the local client node; in response to receiving the request, construct a model from a model pool having a plurality of central models and corresponding keys associated with each of the central models; and send the constructed model to the local client node. Constructing the model from the model pool is based on the key corresponding to the local client node and the keys collectively corresponding to each of the central models. Constructing the model from the model pool comprises aggregating at least two of the plurality of central models contained in the model pool. In some embodiments, the central server node is for enabling accurate distributed machine learning.

According to a fifth aspect, a computer program is provided comprising instructions which when executed by processing circuitry causes the processing circuitry to perform the method of any one of the embodiments of the first or second aspects.

According to a sixth aspect, a carrier is provided containing the computer program of the fifth aspect, wherein the carrier is one of an electronic signal, an optical signal, a radio signal, and a computer readable storage medium.

According to a seventh aspect, a network is provided comprising a central server node and a local client node in communication with each other, the central server node comprising processing circuitry and a memory containing instructions executable by the processing circuitry. The processing circuitry is operable to: receive local model weights and corresponding key from the local client node; and update a model pool having a plurality of central models and corresponding keys associated with each of the central models, wherein updating the model pool is based on the local model weights, and one or more of the key corresponding to the local client node and the keys collectively corresponding to each of the central models, and wherein updating the model pool comprises updating at least two of the plurality of central models contained in the model pool.

According to an eighth aspect, a network is provided comprising a central server node and a local client node in communication with each other, the central server node comprising processing circuitry and a memory containing instructions executable by the processing circuitry. The processing circuitry is operable to: receive a request for a model from the local client node, wherein the request includes a key corresponding to the local client node; in response to receiving the request, construct a model from a model pool having a plurality of central models and corresponding keys associated with each of the central models; and send the constructed model to the local client node, wherein constructing the model from the model pool is based on the key corresponding to the local client node and the keys collectively corresponding to each of the central models, and wherein constructing the model from the model pool comprises aggregating at least two of the plurality of central models contained in the model pool.

BRIEF DESCRIPTION OF THE DRAWINGS

The accompanying drawings, which are incorporated herein and form part of the specification, illustrate various embodiments.

FIGS. 3A and 3B illustrate key distribution according to embodiments.

FIG. 6 is a flow chart according to an embodiment.

FIG. 7 is a flow chart according to an embodiment.

FIG. 9 is a block diagram of an apparatus according to an embodiment.

DETAILED DESCRIPTION

Figure 1:
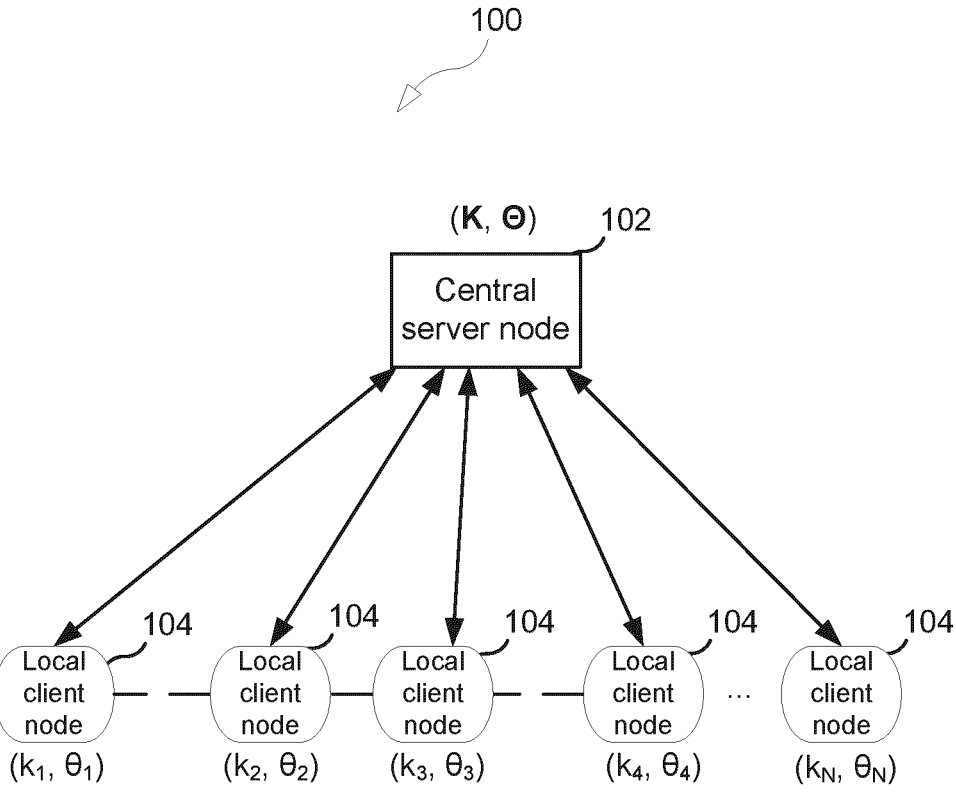
FIG. 1 illustrates a machine learning system according to an embodiment.

FIG. 1 illustrates a system 100 of machine learning according to an embodiment. As shown, a central server node or computing device 102 is in communication with one or more local client nodes or computing devices 104. Optionally, local client nodes or computing devices 104 may be in communication with each other utilizing any of a variety of network topologies and/or network communication systems. For example, local client nodes 104 include user computing devices such as a smart phone, tablet, laptop, personal computer, and so on, and may also be communicatively coupled through a common network such as the Internet (e.g., via WiFi) or a communications network (e.g., LTE or 5G). Central server nodes 104 may include computing devices such as servers, base stations, mainframes, and cloud computing resources. While a central server node or computing device 102 is shown, the functionality of central server node 102 may be distributed across multiple nodes, and may be shared between one or more of local client nodes 104.

As shown, each local client node 104 may communicate model updates to central server node 102, and central server node 102 may send the updated central model to the local client nodes 104. The link between local client nodes 104 and local client nodes 104 is shown as being bidirectional between those entities (e.g. with a two-way link, or through a different communication channel).

Federated learning as described in embodiments herein may involve one or more rounds, where a central model is iteratively trained in each round. Local client nodes 104 may register with the central server node 102 to indicate their willingness to participate in the federated learning of the central model, and may do so continuously or on a rolling basis. Upon registration (and potentially at any time thereafter), the central server node 102 transmit training parameters to local client nodes 104. The central server node 102 may transmit an initial model to the local client nodes 104. For example, the central server node 102 may transmit to the local client nodes 104 a central model (e.g., newly initialized or partially trained through previous rounds of federated learning). The local client nodes 104 may train their individual models locally with their own data. The results of such local training may then be reported back to central server node 102, which may pool the results and update the global model. This process may be repeated iteratively. Further, at each round of training the central model, central server node 102 may select a subset of all registered local client nodes 104 (e.g., a random subset) to participate in the training round.

Central server node 102 is responsible for managing a model pool. As used in this description, "training node" refers to local client nodes 104 participating in learning; and "aggregating node" refers to central server nodes 102 where a model-pool is active. In the discussion below, it is assumed that the training nodes implement regression or classification tasks by using neural networks, for which the labels are only available locally. In embodiments other types of machine learning models may also be applicable.

In some embodiments, the central server node 102 may be used for enabling accurate distributed machine learning.

For discussion purposes, the description below assumes multiple training nodes i=1, . . . , N (a subset of participating local client nodes 104) and one aggregating node i=0 (a central server node 102). Every training node i collects data from an unknow distribution $x \sim p_i$, for which labels y are locally provided by the system of interest, where $x \in \mathbb{R}^n$ and $y \in \mathbb{R}^m$, with n, m≥1. The problem in the node i then consists of learning a parameterized function $f_i : \mathbb{R}^n \times \Theta_i \mapsto \mathbb{R}^n$ from examples (x, y), where the function parameters $\Theta_i$ represent weights of IR the neural networks.

The model pool may be identified by (1) keys K and (2) central models $\Theta$. Therefore, a model pool may be denoted herein as (K, $\Theta$), with boldface indicating the referred elements are vectors. The central models are simple to define since they are weights coming from neural network architectures that are equal to those in the training nodes, here denoted as F.

In FIG. 1, node 0 (the central server node 102) represents an aggregating node where the model-pool (K, $\Theta$) is active and manages the updates from training nodes i=1, . . . , N. Each training node is identified by its key $k_1$ and its local model $\Theta_i$.

Model-Pool Operations

Consider keys as vectors $k_j \in \mathbb{R}^\ell$, with $\ell > 0$, and respective neural networks' weights as vectors $\Theta_j \in \mathbb{R}^d$, with d>>0. The model pool then stores M>0 key-model pairs $(k_j, \Theta_j)$ in a matrix P of dimensions (M, $\ell$ +d). While the discussion refers to P as a matrix, any suitable data structure or storage format of the model pool is within the scope of disclosed embodiments.

From matrix P, every read or write operation depends on computing the similarities between the input key k and all the keys K stored in P. The computed similarities $W=(w_1, w_M)$ are then normalized to have a sum equal to one. For example, normalization may be performed by a softmax function, such as:

$$\sigma(W, b, i) = \frac{b^{w_i}}{\sum_j b^{w_j}}, i = 1, \dots, M \qquad \text{(Eq. 1.)}$$

Figures 2, 2A, 2B:
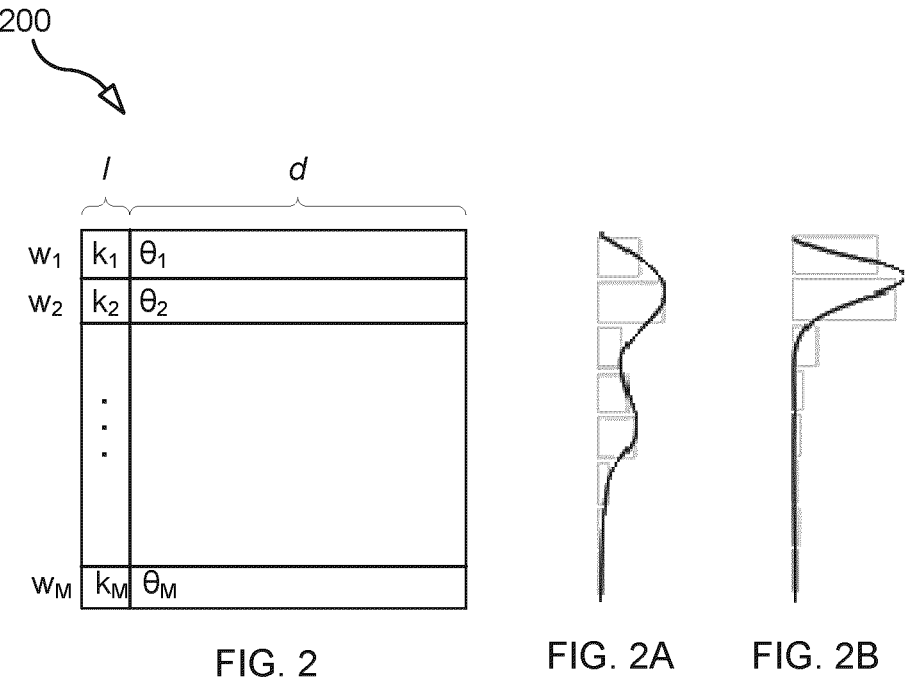
FIG. 2 illustrates a model pool according to an embodiment.
FIGS. 2A and 2B illustrate weight distributions according to embodiments.

Observe that by increasing the base b>0 to large values, probability distributions may be created that are more concentrated around the largest similarities, while by keeping the base b small, probability distributions may be created that are more widely concentrated (compare FIGS. 2A and 2B). In the limit, as b increases, only the most similar row will have a value large enough to influence reading or writing operations. In the opposite case (as b approaches 0), most rows will influence reading or writing operations. From such a pre-processing of the similarities and a particular value of b, W may be redefined as:

$$W=(\sigma(W,b,1),\sigma(W,b,2), \dots ,\sigma(W,b,M))$$

It should be understood that there are other ways to normalize the computed similarities in W.

Reading

The reading operator receives the pre-processed (i.e., normalized) similarity vector W and produces an aggregated model $\Theta_{READ}$, e.g. by a weighted-sum of the central models stored in the pool. An "operator" is generally a mapping that acts on elements of a space to produce elements of another space (possibly the same space). The reading operator acts on the similarity vector W and the models $\Theta$ in the model pool to produce an aggregated model $\Theta_{READ}$. That action is called a reading operation.

The reading operation is performed in response to a model request from a local client node 104. The model request from the local client node 104 may include a key corresponding to the local client node 104. The aggregated model $\Theta_{READ}$ is constructed based on the key corresponding to the local client node 104 and the keys K stored in the model pool collectively corresponding to each of the central models. The aggregated model $\Theta_{READ}$ is constructed by aggregating at least two of the models in the model pool. For example, the key corresponding to the local client node 104 may be used to generate a similarity vector W, which stores the similarities between that key and all the keys K stored in the model pool. Aggregating at least two of the models in the model pool may further be based on the similarity vector W. The at least two of the models in the model pool may be selected based on the similarity vector W or may comprise all of the models in the model pool.

The aggregating may be performed such that that the models having corresponding keys with a higher similarity score (i.e. the corresponding component of the similarity vector W is larger) are weighted more than models having corresponding keys with a lower similarity score. For example, in some embodiments, the reading operation produces an aggregated model $\Theta_{READ}$ by a weighted sum of the central models stored in the pool as follows:

$$\theta_{READ} = \frac{1}{M} \sum_{i=1}^{M} w_i \Theta_i \qquad \text{(Eq. 2.)}$$

After the reading operation produces an aggregated model $\Theta_{READ}$, the aggregated model $\Theta_{READ}$ may be sent to the local client node 104 that sent the model request.

FIG. 2 illustrates a model pool 200 in terms of a matrix P. As shown, there are M key-model pairs $(k_j, \Theta_j)$ in a matrix P of dimensions (M, $\ell$ +d). FIGS. 2A and 2B illustrate two different normalized similarity vectors, one using a small base (FIG. 2A) and the other using a large base (FIG. 2B). The similarity vectors identify which matrix rows (stored central models in the model pool) should influence more intensely the resulting aggregated model. Where the similarity score is highest, the influence will be greater; where the similarity score is lowest, the influence will be smaller. For example, for a similarity score where $w_i \approx 0$, the influence should be minimal. Observe that, in the extreme case of the base b being very large, only the row whose key is the closest to the one received as input significantly influences the creation of the resulting model.

In some embodiments, each model $\Theta_j$ may affect the aggregated model $\Theta_{READ}$, even if slightly. In other embodiments, a subset of the models $\Theta_j$ is selected based on the similarity vector W, such that only the selected subset affect the aggregated model $\Theta_{READ}$. For example, in some embodiments, only models having a similarity higher than a threshold (e.g., 0.05) may be selected, and in some embodiments only the top-n models (e.g., top 20), or the top n % (e.g., top 20%) of models based on similarity score may be selected.

Writing

The writing operator receives as input the pre-processed similarity vector W and the model updates $\overline{\Theta}$ that resulted from local training. An "operator" is generally a mapping that acts on elements of a space to produce elements of another space (possibly the same space). The writing operator acts on the similarity vector W and a received model update $\overline{\Theta}$ to produce an updated model pool. That action is called a writing operation.

The writing operation is performed in response to receiving local model weights (i.e. a local update $\overline{\Theta}$) from a local client node 104. The local client node 104 may include a key corresponding to the local client node 104 when it provides the local model weights. The model pool may be updated based on the local model weights and one or more of the key corresponding to the local client node 104 and the keys K stored in the model pool collectively corresponding to each of the central models. Updating the model pool comprises updating at least two of the models stored in the model pool. For example, the key corresponding to the local client node 104 may be used to generate a similarity vector W, which stores the similarities between that key and all the keys K stored in the model pool. The similarity vector W may be used when updating the model pool. The at least two models that are updated may be selected based on the similarity vector W or may comprise all of the models in the model pool.

The updating of the model pool may be performed by combining the update $\overline{\Theta}$ with current versions of each of the models in the model pool being updated such that that the update $\overline{\Theta}$ is weighted more than the current version of a given model for a given model having a higher corresponding similarity score (i.e. the corresponding component of the similarity vector W is larger) than for a given model having a lower corresponding similarity score. For example, in some embodiments, the similarity vector W may be used to scale the model updates as follows. First, a weighted average may be computed for every entry i in the model pool:

$$\overline{\Theta}_i=(1-w_i)\Theta_i+w_i\overline{\Theta}, \ i=1, \ldots ,M \qquad \text{(Eq. 3.)}$$

Next the new updates $\overline{\Theta}_i$ and the stored values $\Theta_i$ can be averaged and stored back in the model pool (noting that weighting was already performed in calculating $\overline{\Theta}_i$):

$$\Theta_i=(\Theta_i+\overline{\Theta}_i)/2, \ i=1, \ldots ,M.$$

Instead of operating on every entry i in the model pool, some embodiments may instead operate on a subset of the entries i in the model pool.

Because each model update $\overline{\Theta}$ may be processed independently, it is not necessary to wait for each training node to provide its update before updating the model pool. That is, the model pool may be updated as model updates arrive from each of the training nodes.

In some embodiments, each model $\Theta_j$ may be affected by the model updates $\overline{\Theta}$, even if slightly. In other embodiments, a subset of the models $\Theta_j$ is selected based on the similarity vector W, such that only the selected subset is affected by the model updates $\Theta$. For example, in some embodiments, only models having a similarity higher than a threshold (e.g., 0.05) may be selected, and in some embodiments only the top-n models, or the top n % of models based on similarity score may be selected.

Properties of the Keys

The reading and writing operators rely on keys, and the similarity between models is determined based on keys. It can be important, therefore, for the key associated with a model to carry information about two or more aspects of the model: (1) target data distribution and (2) target scenario. Target data distribution refers to the distribution of the training data that a model is targeted for, and target scenario refers to non-training data related characteristics of the deployment environment. For example, a target scenario for a mobile phone could include manufacturer information, network standard (e.g., 4G, 5G), device resource information (e.g., memory, processing capabilities, and so on). The target scenario information may, in some embodiments, depend on the problem domain.

Each training node may produce its own key locally. The local dataset and the scenario description for each training node is referred to as D, S. The process of creating a key k then consists of mapping the high-dimensional inputs D and S to lower-dimensional outputs h(D) and h(S).

To ensure that keys enable read and write operations on the proper entries of the matrix P, the function h should be defined to be locality-preserving. Such a property practically guarantees that two output keys $h(D_1)$ and $h(D_2)$ should be similar if and only if the local datasets $D_1$, $D_2$ are also similar. Techniques for locality-sensitive hashing commonly employ functions having this property. In some embodiments, specific locality-preserving hash functions may be selected based on the domain of the datasets. The key property for purposes of this discussion is that the locality-preserving hashing functions produce lower-dimensional vectors than the original data. Therefore, given a local pair of dataset and scenario description (D, S) and the respective partial keys $k_D=h(D)$ and $k_S=h(S)$, a composite key can be created $K=(k_D, k_S)$. If other local information is relevant for describing the training node, the other local information also can be part of the composite key.

A key for a training node identifies the current state of the training node at a given instant of time. In some embodiments, the key may be recomputed (from local training data and scenario description), e.g. periodically or at certain events, such as every time the local model is sent to the aggregating node for a write operation. Typically the cost of re-computing the keys at every round of learning is negligible, due to two facts: (1) the local training dataset in federated learning is usually not very large; and (2) locality-preserving hashing techniques are usually not complex. As an example, the well-known MinHash technique has worst-case complexity of O(nk), which means it grows no worse than linearly with the size of the dataset n, and a constant k, which allows for increased precision.

Computing the Similarities

The reading and writing operations rely on the similarities between an input key k (corresponding to a training node) and the reference keys K stored in the model pool (collectively corresponding to each of the central models stored in the model pool). As defined in the previous section, every partial key identifies a characteristic of the training node (e.g., data distribution, scenario), and the composite key concatenates all such identifiers.

In embodiments, the similarity metric used for computing the similarities should be able to take into consideration partial keys, i.e., partial knowledge of the training node. Consider for example the situations described below:

(Situation A) The deployment of a model to a new edge node whose characteristics and settings (scenario) is known. Since it is a new deployment, local data is not available. Embodiments allow the node to read a model from the model pool to match the target scenario (partial key).

(Situation B) The deployment of a model to an edge device whose characteristics and settings are unknown, but a sample of local data is already available. Embodiments allow the node to read a model from the model pool to match the target data distribution.

In situation A, there is no data available. Therefore, there is no partial key $k_D$ associated with a target data distribution, i.e., $K=(-, k_S)$. Conversely, in situation B, there is no description of the target scenario of deployment. Therefore, there is no partial key $k_S$ associated, i.e., $K=(k_D, -)$.

The similarity function may take any type of form. In some embodiments, the similarity function may be the sum of the similarities between the partial keys:

$$d(K_1, K_2) = d_D(k_1^D, k_2^D) + d_S(k_1^S, k_2^S) \qquad \text{(Eq. 4.)}$$

In order to support partial keys being unavailable, the similarity between an unavailable partial key and a partial key $$(\text{e.g., } d_D(\cdot, k_1^D))$$

may be defined as zero. In such cases, the unavailable key does not influence the similarities, which means that, regarding such key, all the central models in the pool are equally suited. Therefore, only the remaining part of the key influences the similarity.

An adequately defined similarity measure enables support for both situations A and B, as exemplified below:

(Scenario A) The scenario description S is hashed to produce a partial key $k_S=h(S)$. The model pool manager computes the similarities between the composite key $K=(-, k_S)$, and the stored reference keys. Since the partial key $k_D$ is unavailable, only $k_S$ influences the similarities. Due to the locality preservation of the keys, the reading operation returns an aggregated model biased towards central models whose scenarios are closest to the target scenario.

(Scenario B) The sample local data D is hashed to produce a partial key $k_D=h(D)$. The model pool manager computes the similarities between the composite key $K=(k_D, -)$, and the stored reference keys. Since the partial key $k_S$ is unavailable, only $k_D$ influences the similarities. Due to the locality preservation of the keys, the reading operation returns a model biased towards central models whose training data distribution is closest to the target distribution.

If both partial keys are available, which is the most common situation, a reading operation returns a model biased towards central models whose training data distributions and scenarios are closest to that of the training node. The same happens for writing operations.

It is relevant to notice that, given locality-preserving hashing functions, the similarity measure can be simple and still useful to identify the proper central models in the model pool.

Maintaining the Reference Keys

The reading and writing operations described herein allow the central models to converge towards similar locally trained models. Since similarities are a result of comparing keys, there is no need for direct comparisons of large neural network weight vectors, which improves the scalability of the method. In addition to appropriately defined reading and writing operations, it may also be helpful for improving accuracy to ensure the representativeness of the stored central models.

To better explain what representativeness means in this context, consider FIGS. 3A and 3B, where filled black circles represent the keys of three stored central models, and the unfilled circles represent the keys of locally trained models that were previously read or written. FIG. 3A illustrates a situation in which the reference keys (and corresponding central models) do not cover (or represent) well many of the models read or written, since their keys are too distant. FIG. 3B illustrates a better situation, where the reference keys (and corresponding central models) are better distributed. By guaranteeing that the central models' keys represent well the locally trained models, it is possible to further improve the read and write operations.

At the beginning of a process of learning from decentralized data, central models are untrained. Therefore, it is natural to use the first written models to fill the model pool and use the corresponding keys as the reference keys in the model pool. However, that approach might lead to the case illustrated in FIG. 3A, with poor representative coverage. In embodiments, the stored central models in the model pool and their corresponding keys may be periodically or otherwise updated (e.g., after every reading or writing operation takes place) to provide better representativeness, such as by moving the keys towards the regions where more operations are being performed. That is, in embodiments the keys may be made to adapt to cover the whole distribution of keys read or written during the read and write operations.

In order to update the model pool representativeness, two basic approaches can be taken: one employing a static model-pool size and the other a dynamic model-pool size. Exemplary embodiments of both approaches are described below.

Static Model Pool Size

If the size of the model-pool P (number of rows M) is fixed, i.e. is not allowed to grow or shrink, the reference keys may be maintained by employing the online k-means clustering strategy. Such a strategy considers a data stream (of pairs (k, Θ) in context of this disclosure) as input and updates the positions of k centroids whenever a pair (k, Θ) is received. (Note that the k in k-means refers to the number of clusters, which in this context translates to the number of rows M in P. Italic letters are used when referring to keys, while the un-italicized k is used as the traditional descriptor of the k-means procedure.) Given enough read and/or write operations, the online k-means clustering procedure adapts the keys stored in P to obtain a good coverage of the whole distribution of keys, leading to the situation illustrated by FIG. 3B.

Briefly, the process may work as follows. The first M key-model pairs written to the model pool are stored as initial references. Every succeeding read or write operation triggers a slight adaptation of the closest reference key towards the key provided to the read or write operator. This may be considered a warm-up phase, where the model pool and the key-model pairs therein adapt to the data distribution of the local models.

Note that a change to the reference key in the model pool necessarily entails a change to the corresponding central model. For example, if a new reference key $k_{new}$ is determined, its corresponding model may be determined by performing a read operation on the key $k_{new}$ before the model pool is modified. Then the model pool may be modified by replacing a key-model pair with the newly computed key-model pair.

Although more straightforward to implement, a static model pool size has its limitations. It is not possible to know beforehand how many reference keys to use for a particular use case. If M is smaller than necessary, the model pool reference keys might not be able to represent the multimodal local data distributions particularly well. If M is too large, many reference keys become useless in most read and write operations. Therefore, a dynamic approach might be convenient in some embodiments.

Dynamic Model Pool Size

If the size of the model pool P (number of rows M) is dynamic, i.e. is allowed to grow or shrink, the reference keys may be maintained by employing other strategies such as the growing neural gas technique. Such approaches tackle the same problem as the online k-means clustering technique, but they additionally provide mechanisms to detect the need for insertion or removal of reference keys, which would allow the model pool to grow or shrink.

Briefly, the process may work as follows. The first two key-model pairs written to the model pool are stored as initial references. Every succeeding read or write operation triggers a slight adaptation of some reference keys towards the key provided to the read or write operator. Shrinking occurs by the removal of reference keys that are rarely close to keys provided to the read or write operators. Growing occurs sporadically by the insertion of new reference keys to cover regions in which read or write operations have occurred. Shrinking and growing phases create a dynamic model pool.

Note that a change to the reference key in the model pool necessarily entails a change to the corresponding central model. For example, if a new reference key $k_{new}$ is determined, its corresponding model may be determined by performing a read operation on the key $k_{new}$ before the model pool is modified. Then the model pool may be modified by replacing a key-model pair with the newly computed key-model pair, or by inserting the new key-model pair in the model pool without replacing an existing key-model pair.

Figure 4:
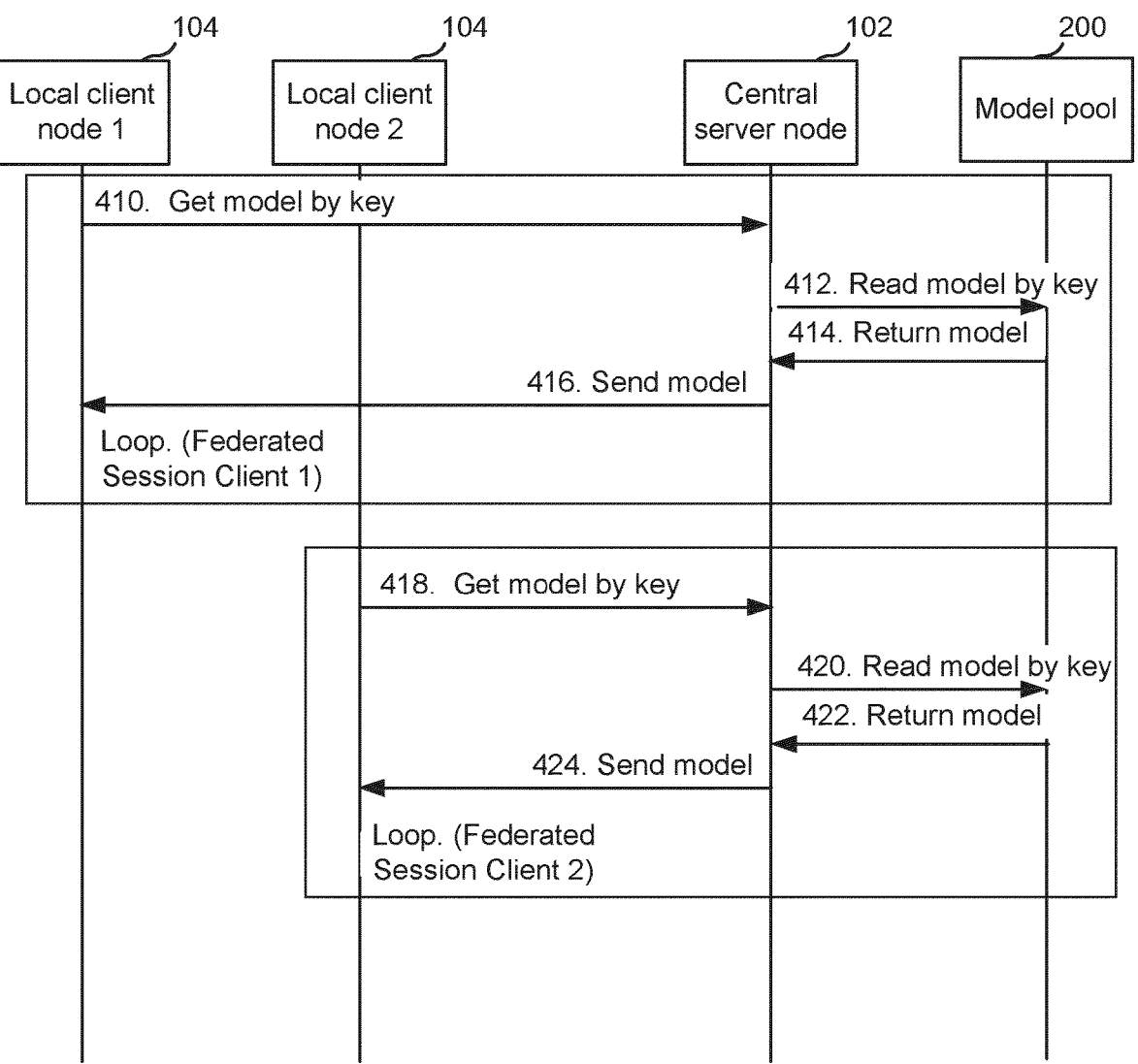
FIG. 4 illustrates a message diagram according to an embodiment.

FIG. 4 illustrates a message flow diagram according to an embodiment. As shown, two local client nodes 104 are in communication with a central server node 102 that maintains a model pool 200.

In the "Federated Session Client 1" loop that is shown, local client node 1 requests a model from central server node 102 by key (at 410). The central server node 102 performs a read operation on the model pool 200 using the key from the local client node 1 to obtain the model by the provided key (at 412, 414). The central server node 102 then sends the model to the local client node 1 that requested it (at 416).

A similar sequence occurs in the "Federated Session Client 2" loop that is shown. Local client node 2 requests a model from central server node 102 by key (at 418). The central server node 102 performs a read operation on the model pool 200 using the key from the local client node 1 to obtain the model by the provided key (at 420, 422). The central server node 102 then sends the model to the local client node 1 that requested it (at 424).

As shown, when the local client node 104 (either local client node 1 or 2) requests a model, it may include a key in its request.

Figure 5:
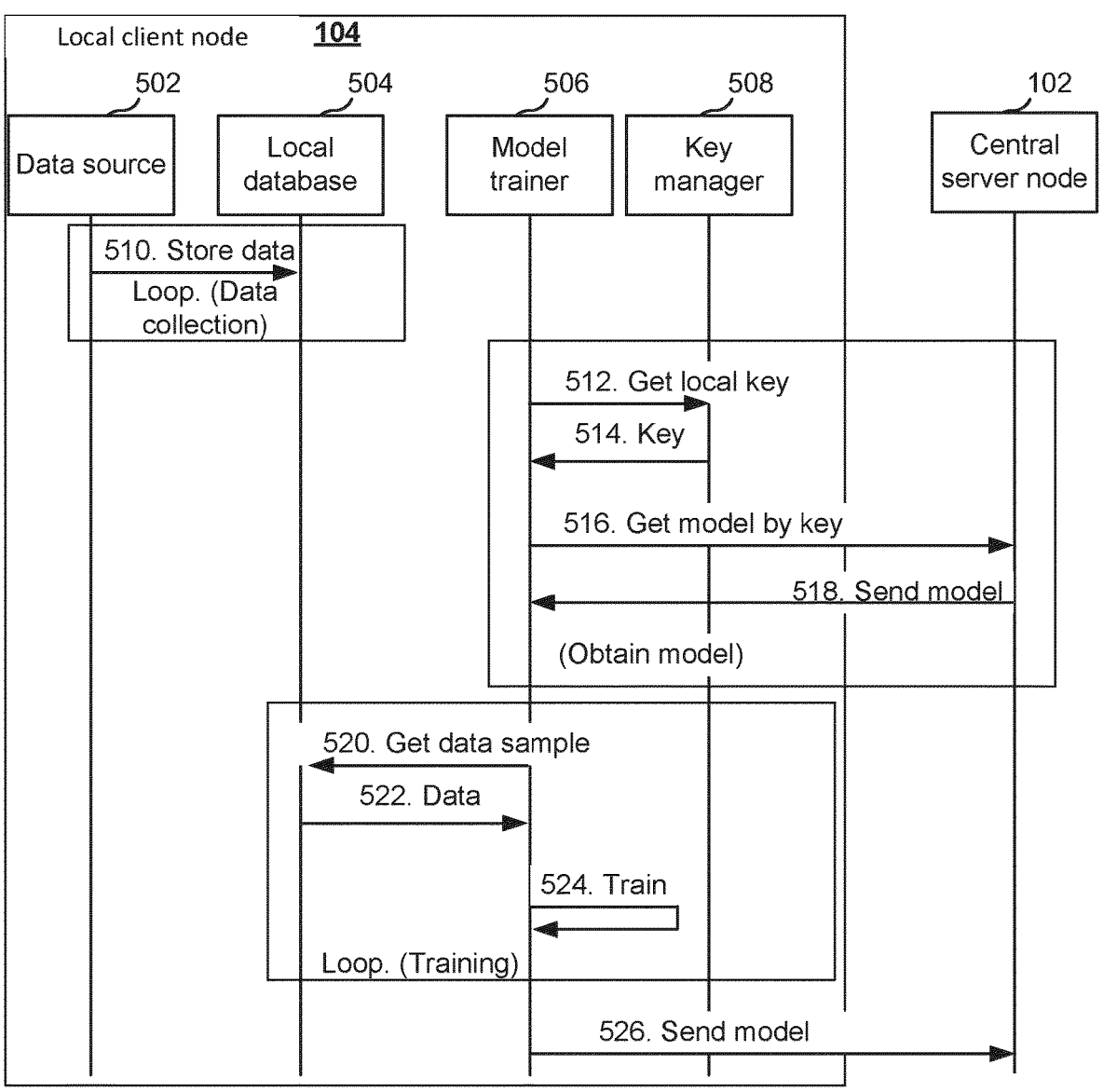
FIG. 5 illustrates a message diagram according to an embodiment.

FIG. 5 illustrates a message flow diagram according to an embodiment. As shown, a local client node 104 is in communication with a central server node 102 that maintains a model pool 200. Local client node 104 may include one or more modules, including a data source 502, a local database 504, a model trainer 506, and a key manager 508. These are illustrated as separate entities of local client node 104, but it should be understood that their functions can also be implemented in more or fewer modules than shown here, and the modules could be remote from the local client node 104.

In the "Data collection" loop that is shown, data collected by data source 502 is stored in the local database 504 (at 510). For example, in embodiments where models in the model pool predict a suffix of a partially-typed word, the data may include the character sequences that a user of the local client node 104 types. Generally the collected data will be application specific.

In the "Obtain model" loop that is shown, model trainer 506 requests the local key from key manager 508, which then provides the key (at 512, 514). Model trainer 506 may then use the local key to request the model from the central server node 102 (at 516). The central server node 102 uses the key to obtain the model (e.g., see FIG. 4), and then sends the model to the model trainer 506 that requested it (at 518).

In the "Training" loop that is shown, the model trainer 506 requests the data samples from the local database 504, which then provides the data samples (at 520, 522). For example, this can include the data collected during the "Data collection" loop. The model trainer 506 then uses this data to train the model (at 524).

The trained model may then be sent to the central server node 102. The local client node 102 may also provide the local key to the central server node 102, so that the central server node 102 may perform a write operation on the model pool 200.

FIG. 6 illustrates a flow chart according to an embodiment. Process 600 is a method performed by a central server computing device 102. Process 600 may begin with step s602.

Step s602 comprises receiving local model weights and corresponding key from a local client node.

Step s604 comprises updating a model pool having a plurality of central models and corresponding keys associated with each of the central models.

Step s608 comprises wherein updating the model pool is based on the local model weights, and one or more of the key corresponding to the local client node and the keys collectively corresponding to each of the central models.

Step s610 comprises wherein updating the model pool comprises updating at least two of the plurality of central models contained in the model pool.

In some embodiments, updating the model pool further comprises computing a similarity score comparing the key corresponding to the local client node to the keys collectively corresponding to each of the plurality of central models, and wherein updating at least two of the plurality of central models is based on the similarity score. In some embodiments, the method further includes selecting the at least two of the plurality of central models from the model pool based on the similarity score. In some embodiments, the at least two of the plurality of central models from the model pool comprise all of the plurality of central models. In some embodiments, updating at least two of the plurality of central models comprises, for each central model of the at least two of the plurality of central models, combining the local model weights with a current version of the central model such that the local model weights are given a greater weight for central models having a higher corresponding similarity score than for central models having a lower corresponding similarity score.

In some embodiments, updating at least two of the plurality of central models comprises computing new model weights $$\Theta_i^{new} = \left(\Theta_i^{old} + \overline{\Theta}_i\right)/2$$

for each i in a set of indexes corresponding to the at least two of the plurality of central models, where:

$$\Theta_i^{new}$$

refers to the new model weights for the central model corresponding to the index i, $$\Theta_i^{old}$$

refers to old model weights for the central model corresponding to the index i, $$\overline{\Theta}_i = (1 - w_i)\Theta_i^{old} + w_i\overline{\Theta},$$

$W=(w_1, \ldots, w_M)$ is the similarity score, such that $w_i$ corresponds to the similarity between the key corresponding to the local client node and the key corresponding to the i-th central model of the plurality of central models, M is the number of the plurality of central models in the model pool, and $\overline{\Theta}$ refers to the local model weights.

In some embodiments, the similarity score W is normalized such that $\Sigma w_i=1$. In some embodiments, one or more keys of the key corresponding to the local client node and the keys of the model pool corresponding collectively to each of the plurality of central models, each includes a data distribution part and a deployment part, wherein the data distribution part of each of the one or more keys includes information describing a data distribution corresponding to the respective local client node or central model, and wherein the deployment part of each of the one or more keys includes information describing a deployment environment corresponding to the respective local client node or central model. In some embodiments, computing a similarity score is based on a similarity function $d(k_1, k_2)$ between a first key $k_1$ having data distribution part $$k_1^D$$

and deployment part $$k_1^S$$

and a second key $k_2$ having data distribution part $$k_2^D$$

and deployment part $$k_2^S, \text{ such that } d(k_1, k_2) = d_D\left(k_1^D, k_2^D\right) + d_S\left(k_1^S, k_2^S\right).$$

In some embodiments, updating the model pool is performed as a result of receiving local model weights and a corresponding key, without needing to wait on additional local model weights (e.g., from so-called stragglers, that is, local nodes that do not provide their local updates in time) and corresponding keys from additional local client nodes. In some embodiments, the method further includes modifying the model pool such that a distribution of the keys corresponding to the central models of the model pool is modified based on the corresponding key from the local client node. For example, the static or dynamic model pool size approaches described above can be employed to update the model pool such that a distribution of the keys corresponding to the central models of the model pool is modified based on the corresponding key from the local client node.

FIG. 7 illustrates a flow chart according to an embodiment. Process 700 is a method performed by a central server computing device 102. Process 700 may begin with step s702.

Step s702 comprises receiving a request for a model from a local client node, wherein the request includes a key corresponding to the local client node.

Step s704 comprises, in response to receiving the request, constructing a model from a model pool having a plurality of central models and corresponding keys associated with each of the central models.

Step s706 comprises sending the constructed model to the local client node.

Step s708 comprises wherein constructing the model from the model pool is based on the key corresponding to the local client node and the keys collectively corresponding to each of the central models.

Step s710 comprises wherein constructing the model from the model pool comprises aggregating at least two of the plurality of central models contained in the model pool.

In some embodiments, constructing the model from the model pool further comprises computing a similarity score comparing the key corresponding to the local client node to the keys collectively corresponding to each of the plurality of central models, and wherein aggregating at least two of the plurality of central models is based on the similarity score. In some embodiments, the method further includes selecting the at least two of the plurality of central models from the model pool based on the similarity score. In some embodiments, the at least two of the plurality of central models from the model pool comprise all of the plurality of central models. In some embodiments, aggregating at least two of the plurality of central models is performed such that the central models of the at least two of the plurality of central models having a higher corresponding similarity score are weighted more than models having a lower corresponding similarity score.

In some embodiments, aggregating at least two of the plurality of central models comprises computing aggregated model weights $$\theta^{agg} = \frac{1}{M}\sum_{i=1}^{M} w_i \theta_i,$$

where:

$$\Theta_i^{agg}$$

refers to the aggregated model weights for the constructed model,

M is the number of the plurality of central models in the model pool, $\theta_i$ refers to model weights for the central model corresponding to the index i, and $W=(w_1, \ldots, w_M)$ is the similarity score, such that $w_i$ corresponds to the similarity between the key corresponding to the local client node and the key corresponding to the i-th central model of the plurality of central models.

In some embodiments, the similarity score W is normalized such that $\Sigma w_i=1$. In some embodiments, one or more keys of the key corresponding to the local client node and the keys of the model pool corresponding collectively to each of the plurality of central models, each includes a data distribution part and a deployment part, wherein the data distribution part of each of the one or more keys includes information describing a data distribution corresponding to the respective local client node or central model, and wherein the deployment part of each of the one or more keys includes information describing a deployment environment corresponding to the respective local client node or central model.

In some embodiments, computing a similarity score is based on a similarity function $d(k_1, k_2)$ between a first key $k_1$ having data distribution part $k_1^D$ and deployment part $$k_1^S$$

and a second key $k_2$ having data distribution part $$k_2^D$$

and deployment part $$k_2^S,$$

such that $$d(k_1, k_2) = d_D(k_1^D, k_2^D) + d_S(k_1^S, k_2^S).$$

In some embodiments, the method further includes modifying the model pool such that a distribution of the keys corresponding to the central models of the model pool is modified based on the corresponding key from the local client node. For example, the static or dynamic model pool size approaches described above can be employed to update the model pool such that a distribution of the keys corresponding to the central models of the model pool is modified based on the corresponding key from the local client node.

Figure 8:
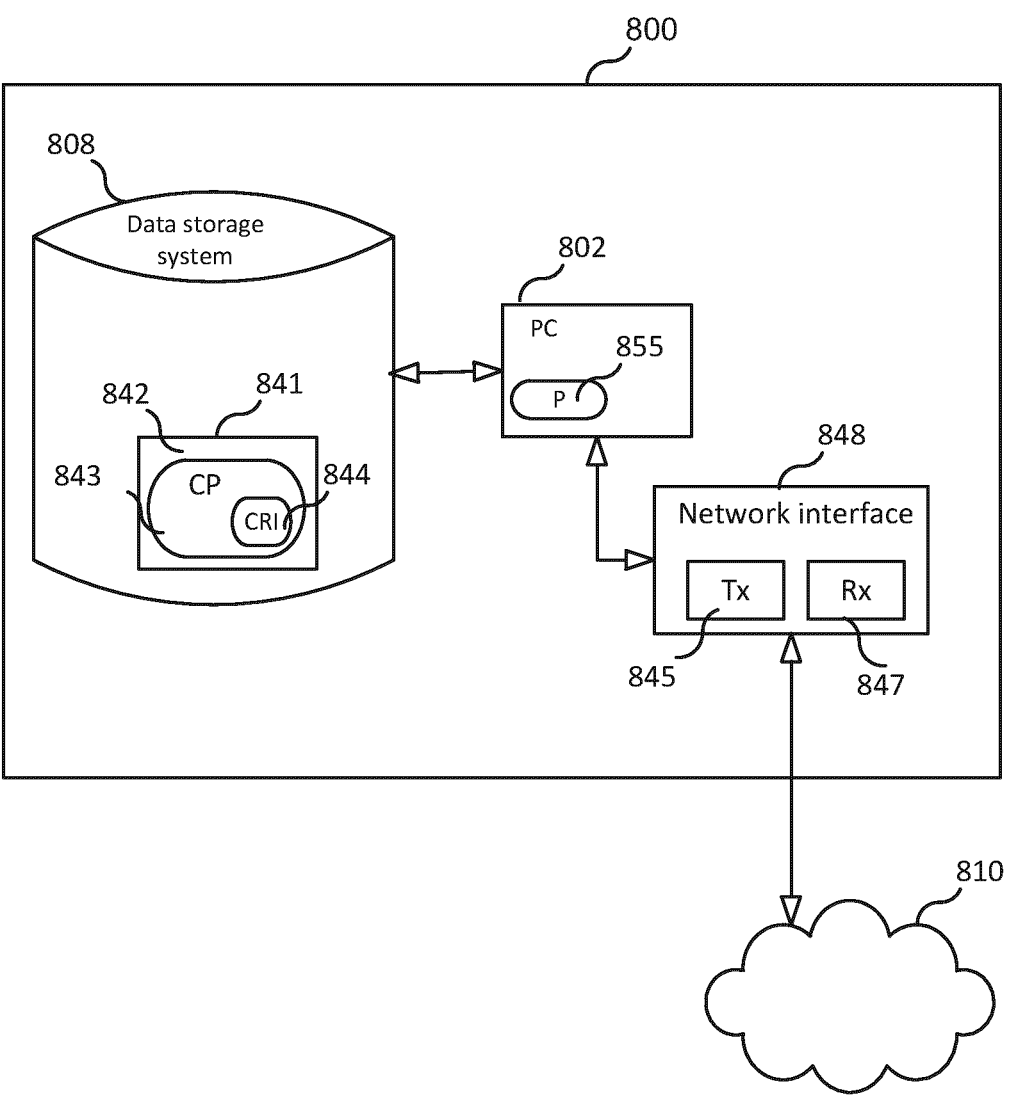
FIG. 8 is a block diagram of an apparatus according to an embodiment.

FIG. 8 is a block diagram of an apparatus 800 (e.g., a local client node 104 and/or central server node 102), according to some embodiments. As shown in FIG. 8, the apparatus may comprise: processing circuitry (PC) 802, which may include one or more processors (P) 855 (e.g., a general purpose microprocessor and/or one or more other processors, such as an application specific integrated circuit (ASIC), field-programmable gate arrays (FPGAs), and the like); a network interface 848 comprising a transmitter (Tx) 845 and a receiver (Rx) 847 for enabling the apparatus to transmit data to and receive data from other nodes connected to a network 810 (e.g., an Internet Protocol (IP) network) to which network interface 848 is connected; and a local storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes the apparatus to perform steps described herein (e.g., steps described herein with reference to the flow charts). In other embodiments, the apparatus may be configured to perform steps described herein without the need for code. That is, for example, PC 802 may consist merely of one or more ASICs. Hence, the features of the embodiments described herein may be implemented in hardware and/or software.

Figure 9:
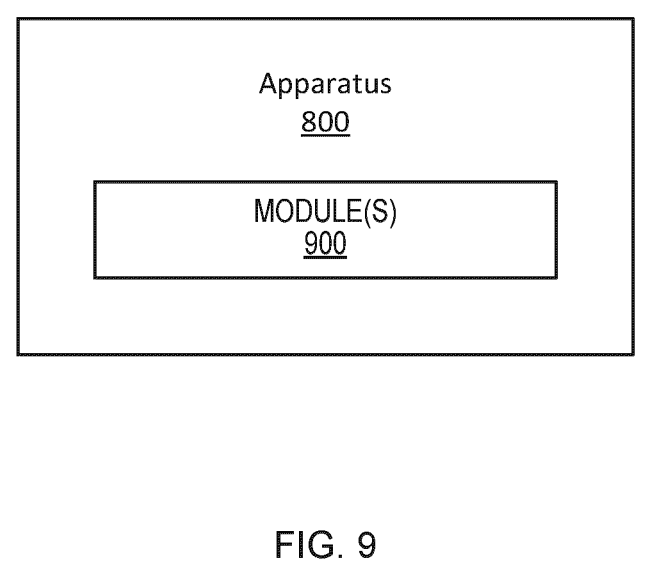

FIG. 9 is a schematic block diagram of the apparatus 800 according to some other embodiments. The apparatus 800 includes one or more modules 900, each of which is implemented in software. The module(s) 900 provide the functionality of apparatus 800 described herein (e.g., the steps herein, e.g., with respect to FIGS. 4-7).

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a central server node, the method comprising:

receiving local model weights and a corresponding key from a local client node; and updating a model pool having a plurality of central models and corresponding keys associated with each of the central models, wherein updating the model pool is based on the local model weights, and one or more of the key corresponding to the local client node and the keys collectively corresponding to each of the central models, and wherein updating the model pool comprises updating at least two of the plurality of central models contained in the model pool, wherein the central server node is a base station in a 5G communications network;

wherein the local client node is a mobile device communicatively coupled with the base station via radio signal through the 5G communications network;

wherein updating the model pool further comprises computing a similarity score comparing the key corresponding to the local client node to the keys collectively corresponding to each of the plurality of central models, and wherein updating at least two of the plurality of central models is based on the similarity score, and wherein updating at least two of the plurality of central models comprises computing new model weights $$\Theta_i^{new} = \left(\Theta_i^{old} + \overline{\Theta}_i\right)/2$$

for each i in a set of indexes corresponding to the at least two of the plurality of central models, where:

$$\Theta_i^{new}$$

refers to the new model weights for the central model corresponding to the index i, $$\Theta_i^{old}$$

refers to old model weights for the central model corresponding to the index i, $$\overline{\Theta}_i = (1 - w_i)\Theta_i^{old} + w_i\overline{\Theta}.$$

$W=(w_1, \ldots, w_M)$ is the similarity score, such that $w_i$ corresponds to the similarity between the key corresponding to the local client node and the key corresponding to the i-th central model of the plurality of central models, M is the number of the plurality of central models in the model pool, and $\overline{\Theta}$ refers to the local model weights.

2. A method performed by a central server node, the method comprising:

receiving a request for a model from a local client node, wherein the request includes a key corresponding to the local client node;

in response to receiving the request, constructing a model from a model pool having a plurality of central models and corresponding keys associated with each of the central models; and sending the constructed model to the local client node, wherein constructing the model from the model pool is based on the key corresponding to the local client node and the keys collectively corresponding to each of the central models, and wherein constructing the model from the model pool comprises aggregating at least two of the plurality of central models contained in the model pool, wherein the central server node is a base station in a 5G communications network;

wherein the local client node is a mobile device communicatively coupled with the base station via radio signal through the 5G communications network;

wherein constructing the model from the model pool further comprises computing a similarity score comparing the key corresponding to the local client node to the keys collectively corresponding to each of the plurality of central models, and wherein aggregating at least two of the plurality of central models is based on the similarity score, and wherein aggregating at least two of the plurality of central models comprises computing aggregated model weights $$\theta^{agg} = \frac{1}{M}\sum_{i=1}^{M} w_i\theta_i,$$

where:

$$\Theta_i^{agg}$$

refers to the aggregated model weights for the constructed model,

M is the number of the plurality of central models in the model pool, $\theta_i$ refers to model weights for the central model corresponding to the index i, and $W=(w_1, \ldots, w_M)$ is the similarity score, such that $w_i$ corresponds to the similarity between the key corresponding to the local client node and the key corresponding to the i-th central model of the plurality of central models.

3. A central server node, the central server node comprising processing circuitry and a memory containing instructions executable by the processing circuitry, whereby the processing circuitry is operable to:

receive local model weights and a corresponding key from a local client node; and update a model pool having a plurality of central models and corresponding keys associated with each of the central models, wherein updating the model pool is based on the local model weights, and one or more of the key corresponding to the local client node and the keys collectively corresponding to each of the central models, wherein updating the model pool comprises updating at least two of the plurality of central models contained in the model pool, wherein the central server node is a base station in a 5G communications network;

wherein the local client node is a mobile device communicatively coupled with the base station via radio signal through the 5G communications network;

wherein updating the model pool further comprises computing a similarity score comparing the key corresponding to the local client node to the keys collectively corresponding to each of the plurality of central models, and wherein updating at least two of the plurality of central models is based on the similarity score, and wherein updating at least two of the plurality of central models comprises computing new model weights $$\theta_i^{new} = \left(\Theta_i^{old} + \overline{\Theta}_i\right)/2$$

for each i in a set of indexes corresponding to the at least two of the plurality of central models, where:

$$\Theta_i^{new}$$

refers to the new model weights for the central model corresponding to the index i, $$\Theta_i^{old}$$

refers to old model weights for the central model corresponding to the index i, $$\overline{\Theta}_i = (1 - w_i)\Theta_i^{old} + w_i\overline{\Theta}.$$

$W=(w_1, \ldots, w_M)$ is the similarity score, such that $w_i$ corresponds to the similarity between the key corresponding to the local client node and the key corresponding to the i-th central model of the plurality of central models, M is the number of the plurality of central models in the model pool, and $\overline{\Theta}$ refers to the local model weights.

4. The central server node of claim 3, wherein the processor is further configured to select the at least two of the plurality of central models from the model pool based on the similarity score.

5. The central server node of claim 3, wherein updating at least two of the plurality of central models comprises, for each central model of the at least two of the plurality of central models, combining the local model weights with a current version of the central model such that the local model weights are given a greater weight for central models having a higher corresponding similarity score than for central models having a lower corresponding similarity score.

6. The central server node of claim 3, wherein the similarity score W is normalized such that $\Sigma w_i=1$.

7. The central server node of claim 3, wherein updating the model pool is performed as a result of receiving local model weights and a corresponding key, without needing to wait on additional local model weights and corresponding keys from additional local client nodes.

8. The central server node of claim 3, wherein the processor is further configured to update the model pool such that a distribution of the keys corresponding to the central models of the model pool is modified based on the corresponding key from the local client node.

9. A central server node, the central server node comprising processing circuitry and a memory containing instructions executable by the processing circuitry, whereby the processing circuitry is operable to:

receive a request for a model from a local client node, wherein the request includes a key corresponding to the local client node;

in response to receiving the request, construct a model from a model pool having a plurality of central models and corresponding keys associated with each of the central models; and send the constructed model to the local client node, wherein constructing the model from the model pool is based on the key corresponding to the local client node and the keys collectively corresponding to each of the central models, wherein constructing the model from the model pool comprises aggregating at least two of the plurality of central models contained in the model pool, wherein the central server node is a base station in a 5G communications network;

wherein the local client node is a mobile device communicatively coupled with the base station via radio signal through the 5G communications network;

wherein constructing the model from the model pool further comprises computing a similarity score comparing the key corresponding to the local client node to the keys collectively corresponding to each of the plurality of central models, and wherein aggregating at least two of the plurality of central models is based on the similarity score, and wherein aggregating at least two of the plurality of central models comprises computing aggregated model weights $$\theta^{agg} = \frac{1}{M}\sum_{i=1}^{M} w_i\theta_i,$$

where:

$$\Theta_i^{agg}$$

refers to the aggregated model weights for the constructed model,

M is the number of the plurality of central models in the model pool, $\theta_i$ refers to model weights for the central model corresponding to the index i, and $W=(w_1, \ldots, w_M)$ is the similarity score, such that $w_i$ corresponds to the similarity between the key corresponding to the local client node and the key corresponding to the i-th central model of the plurality of central models.

10. The central server node of claim 9, wherein the at least two of the plurality of central models from the model pool comprise all of the plurality of central models.

11. The central server node of claim 9, wherein aggregating at least two of the plurality of central models is performed such that the central models of the at least two of the plurality of central models having a higher corresponding similarity score are weighted more than models having a lower corresponding similarity score.

12. The central server node of claim 9, wherein the similarity score W is normalized such that $\Sigma w_i=1$.

13. The central server node of claim 9, wherein one or more keys of the key corresponding to the local client node and the keys of the model pool corresponding collectively to each of the plurality of central models, each includes a data distribution part and a deployment part, wherein the data distribution part of each of the one or more keys includes information describing a data distribution corresponding to the respective local client node or central model, and wherein the deployment part of each of the one or more keys includes information describing a deployment environment corresponding to the respective local client node or central model.

14. The central server node of claim 13, wherein computing a similarity score is based on a similarity function $d(k_1, k_2)$ between a first key $k_1$ having data distribution part $$k_1^D$$

and deployment part $$k_1^S$$

and a second key $k_2$ having data distribution part $$k_2^D$$

and deployment part $$k_2^S, \text{ such that } d(k_1, k_2) = d_D\left(k_1^D, k_2^D\right) + d_S\left(k_1^S, k_2^S\right).$$

15. The central server node of claim 9, wherein the processor is further configured to update the model pool such that a distribution of the keys corresponding to the central models of the model pool is modified based on the corresponding key from the local client node.

16. The central server node according to claim 3, for enabling accurate distributed machine learning.

\* \* \* \* \*